(12) United States Patent
Shotey et al.

(10) Patent No.: US 7,449,634 B1
(45) Date of Patent: Nov. 11, 2008

(54) ELECTRICAL DEVICE COVER

(75) Inventors: Marcus J. Shotey, Scottsdale, AZ (US); Richard Cleghorn, Tempe, AZ (US); Jeffrey P. Baldwin, Phoenix, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 11/753,148

(22) Filed: May 24, 2007

Related U.S. Application Data

(60) Provisional application No. 60/803,106, filed on May 24, 2006.

(51) Int. Cl.
*H02G 3/14* (2006.01)

(52) U.S. Cl. .............................. 174/66; 174/67; 174/53; 220/241; 220/242

(58) Field of Classification Search ................. 174/480, 174/481, 50, 53, 57, 58, 66, 67; 220/3.2–3.9, 220/4.02, 241, 242; 439/535, 536; D13/156
See application file for complete search history.

(56) References Cited

U.S. PATENT DOCUMENTS

| | | | |
|---|---|---|---|
| 872,694 A | 12/1907 | Thiem | |
| 932,601 A | 8/1909 | Corbett | |
| 1,608,621 A | 11/1926 | Sachs | |
| 1,784,277 A | 12/1930 | Darlington | |
| 1,952,719 A | 3/1934 | Lewin | |
| 2,240,187 A | 4/1941 | Kingdon et al. | |
| 2,526,606 A | 10/1950 | Gregg | |
| 2,916,733 A | 12/1959 | Hirsch | |
| 3,252,611 A | 5/1966 | Weitzman et al. | |
| 3,432,611 A | 3/1969 | Gaines et al. | |
| 3,437,738 A | 4/1969 | Wagner | |
| 3,438,534 A | 4/1969 | Zerwes | |
| 3,491,327 A | 1/1970 | Tait et al. | |
| 3,518,356 A | 6/1970 | Friedman | |
| 3,530,230 A | 9/1970 | Cormier | |
| 3,544,703 A | 12/1970 | Jones | |
| 3,564,112 A | 2/1971 | Algotsson et al. | |
| 3,598,897 A * | 8/1971 | Castic | ......................... 174/481 |
| 3,654,663 A | 4/1972 | Algotsson | |
| 3,690,035 A | 9/1972 | Schindlauer | |
| 3,895,179 A | 7/1975 | Wyatt | |
| 3,956,573 A * | 5/1976 | Myers et al. | .................. 174/57 |
| 3,965,287 A | 6/1976 | Mueller | |
| 4,032,030 A | 6/1977 | Bass | |
| 4,197,959 A | 4/1980 | Kramer | |
| 4,342,493 A | 8/1982 | Grenell | |
| 4,424,407 A | 1/1984 | Barbic | |
| 4,500,746 A | 2/1985 | Meehan | |
| 4,705,335 A | 11/1987 | Goebel | |

(Continued)

FOREIGN PATENT DOCUMENTS

GB 326377 3/1930

*Primary Examiner*—Angel R Estrada
(74) *Attorney, Agent, or Firm*—Booth Udall, PLC

(57) ABSTRACT

An electrical device cover with a rotatable lid. An implementation of a weatherproof electrical device cover may include a base unit having a face, an electrical device aperture, and a box mounting screw aperture therethrough. A lid may be rotatably coupled to the base unit and rotate over the base unit in a plane substantially parallel with the base unit. The lid may cover the electrical device aperture of the base unit when the lid is closed over the base unit.

16 Claims, 5 Drawing Sheets

U.S. PATENT DOCUMENTS

| | | | |
|---|---|---|---|
| 4,737,599 A | 4/1988 | Fontaine | |
| 4,757,908 A | 7/1988 | Medlin, Sr. | |
| 4,833,277 A | 5/1989 | Jacoby | |
| 4,844,275 A | 7/1989 | Schnell et al. | |
| 4,979,634 A | 12/1990 | Begley | |
| 4,998,635 A | 3/1991 | Vink et al. | |
| 5,072,848 A | 12/1991 | Pipis et al. | |
| 5,076,641 A | 12/1991 | Lindberg | |
| 5,160,809 A * | 11/1992 | Yang | 174/481 |
| 5,178,350 A | 1/1993 | Vink et al. | |
| 5,218,196 A | 6/1993 | Riceman | |
| 5,280,135 A | 1/1994 | Berlin et al. | |
| 5,362,924 A | 11/1994 | Correnti | |
| 5,527,993 A | 6/1996 | Shotey et al. | |
| 5,556,289 A | 9/1996 | Holbrook | |
| 5,763,831 A | 6/1998 | Shotey et al. | |
| 6,160,219 A | 12/2000 | Maltby et al. | |
| D460,421 S * | 7/2002 | Marozsan, Jr. | D13/156 |
| 6,450,353 B1 * | 9/2002 | Riedy et al. | 220/3.3 |
| 6,476,321 B1 | 11/2002 | Shotey et al. | |
| 6,891,104 B2 * | 5/2005 | Dinh | 174/67 |
| 7,064,268 B2 * | 6/2006 | Dinh | 220/4.02 |
| 7,129,413 B1 * | 10/2006 | Rao et al. | 174/66 |
| 7,151,221 B1 * | 12/2006 | Backofen et al. | 174/67 |

\* cited by examiner

ELECTRICAL DEVICE COVER

CROSS REFERENCE TO RELATED APPLICATIONS

This document claims the benefit of the filing date of U.S. Provisional Patent Application 60/803,106, entitled "Corner Pivot Electrical Device Cover" to Shotey, et al. which was filed on May 24, 2006, the disclosure of which is hereby incorporated entirely herein by reference.

The disclosure of U.S. patent application to Michael J. Shotey et al. entitled "Horizontal and Vertical In-Use Electrical Device Cover," Ser. No. 11/428,814, filed Jul. 5, 2006, is hereby incorporated herein by reference.

BACKGROUND

1. Technical Field

Aspects of this document relate generally to covers for electrical devices.

2. Background Art

Electrical devices often include protection from water and other contaminants. To provide the needed protection, covers have been conventionally used, particularly when electrical devices are mounted in outdoor locations. A wide variety of cover designs have been devised, the most common being a cover that includes a base hingedly attached to a lid that closes over the face of an electrical device under gravity force, such as that disclosed in U.S. Pat. No. 5,763,831 to Shotey (issued Jun. 9, 1998), the relevant disclosure of which is hereby incorporated herein by reference.

SUMMARY

An implementation of a weatherproof electrical device cover may include a base unit having a face, an electrical device aperture, and a box mounting screw aperture therethrough. A lid may be rotatably coupled to the base unit and rotate over the base unit in a plane substantially parallel with the base unit. The lid may cover the electrical device aperture of the base unit when the lid is closed over the base unit.

Particular implementations of a weatherproof electrical device cover may include a lid having a pin and coupled to the base unit at a pin opening in the base unit. The pin may be coupled within the pin opening to the base unit through a spring. In particular implementations, the pin may have a key and the pin opening a keyway notch, where the lid rotatably closes over the base unit when the key is aligned with the keyway notch.

An implementation of an electrical device cover may include a base unit comprising an electrical device aperture, a box mounting screw aperture therethrough, and a pin opening. A lid having a pin may also be included, and the base unit and lid may be coupled through the pin at the pin opening. The lid may rotate over the base unit in a plane substantially parallel with the base unit. In particular implementations, the pin may be coupled within the pin opening to the base unit through a spring. The pin may further include a key and the pin opening a keyway notch, where the lid rotatably closes over the base unit when the key is aligned with the keyway notch.

Particular implementations of an electrical device cover and/or a weatherproof electrical device cover may include one, all, or some of the following:

The base unit and the lid may be rotatably coupled at least one of a side of the base unit and a corner of the base unit. The lid of the base unit may be configured to close over the base unit under gravity force when the cover is mounted to a wall in either a vertical or a horizontal orientation.

The base unit may be configured to accommodate a first electrical device type and the base unit may further have at least one removable tab, where removing the at least one removable tab converts the electrical device aperture in the base unit to accommodate at least a second electrical device type different from the first electrical device type. The base unit may be configured to accommodate a first electrical device type and have at least one adapter plate, where the adapter plate converts the electrical device aperture in the base unit to accommodate at least a second electrical device type different from the first electrical device type. The adapter plate may further include at least one removable tab, where removal of the at least one removable tab converts the electrical device aperture in the base unit configured to accommodate a first electrical device type to accommodate at least a second electrical device type different from the first electrical device type.

A cord port may be included in at least one of a surface of the lid and the base unit.

The lid may further include a perimeter and a flange extending outwardly along at least a portion of the perimeter, where the flange is configured to slidably couple over a portion of the base unit when the lid is closed over the base unit.

Implementations of an electrical device cover and/or a weatherproof electrical device cover may utilize a method of closing the electrical device cover including the steps of: rotatably coupling a lid to a base unit having an electrical device aperture and a box mounting screw aperture therethrough, rotating the lid in a plane substantially parallel with the base unit, and covering the electrical device aperture of the base unit with the lid.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended electrical device cover and/or assembly procedures for an electrical device cover will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such electrical device covers and implementing components, consistent with the intended operation.

Structure.

Figure 1:
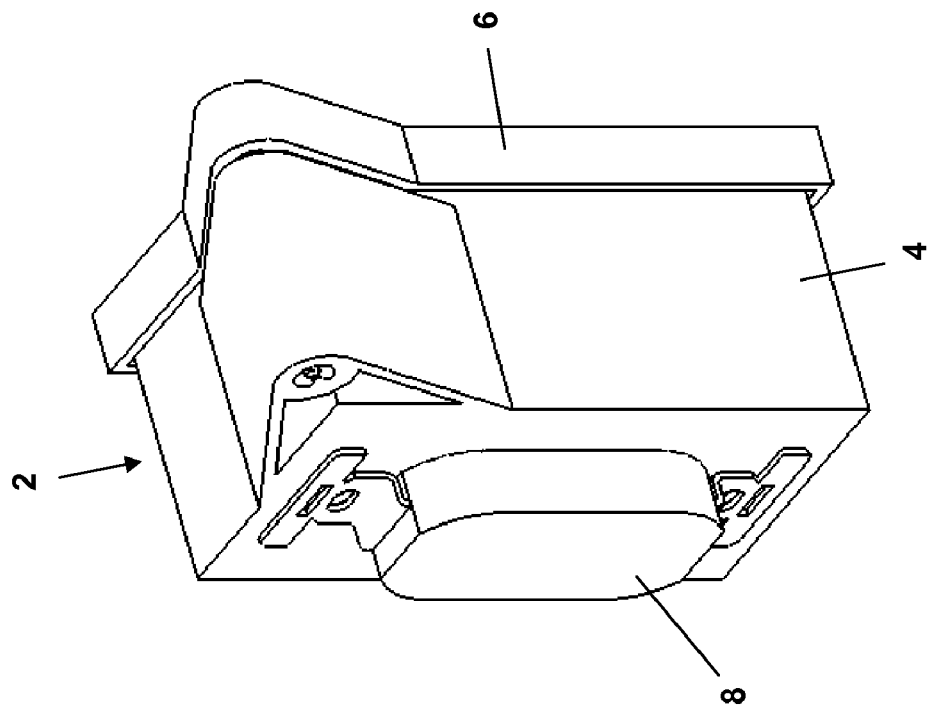
FIG. 1 is a front perspective view of a particular implementation of an electrical device cover with the lid closed over the base unit showing the sectional line A.
Figure 2:
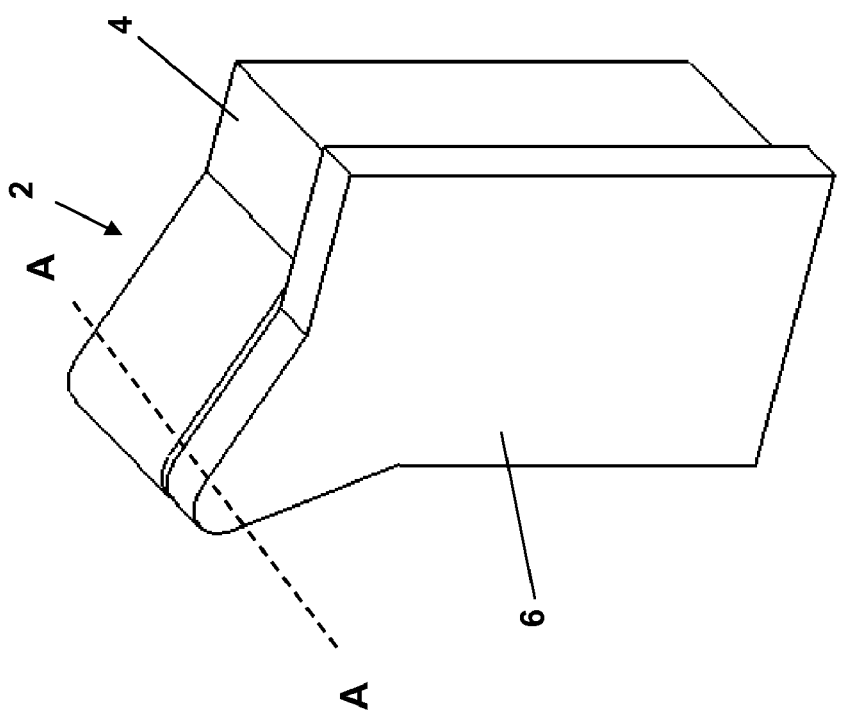
FIG. 2 is a rear perspective view of the electrical device cover of FIG. 1 with an electrical device coupled to the cover.

Referring to FIG. 1, a particular implementation of an electrical device cover 2 is illustrated. The electrical device cover 2 may include a base unit 4 coupled to a lid 6. While the base unit 4 illustrated is shown as a single piece, in other implementations the base unit 4 may be formed of any number of pieces coupled together. FIG. 2 illustrates a rear view of the particular implementation of the electrical device cover 2 showing an electrical device 8 coupled to the base unit 4. The electrical device cover 2 may be coupled over the electrical device 8 when the electrical device 8 has been installed in a wall or other location. Particular implementations of an electrical device cover 2 may be weatherproof and, therefore, resist entry of water and other contaminants through use of the lid 6 and other structures.

Figure 3:
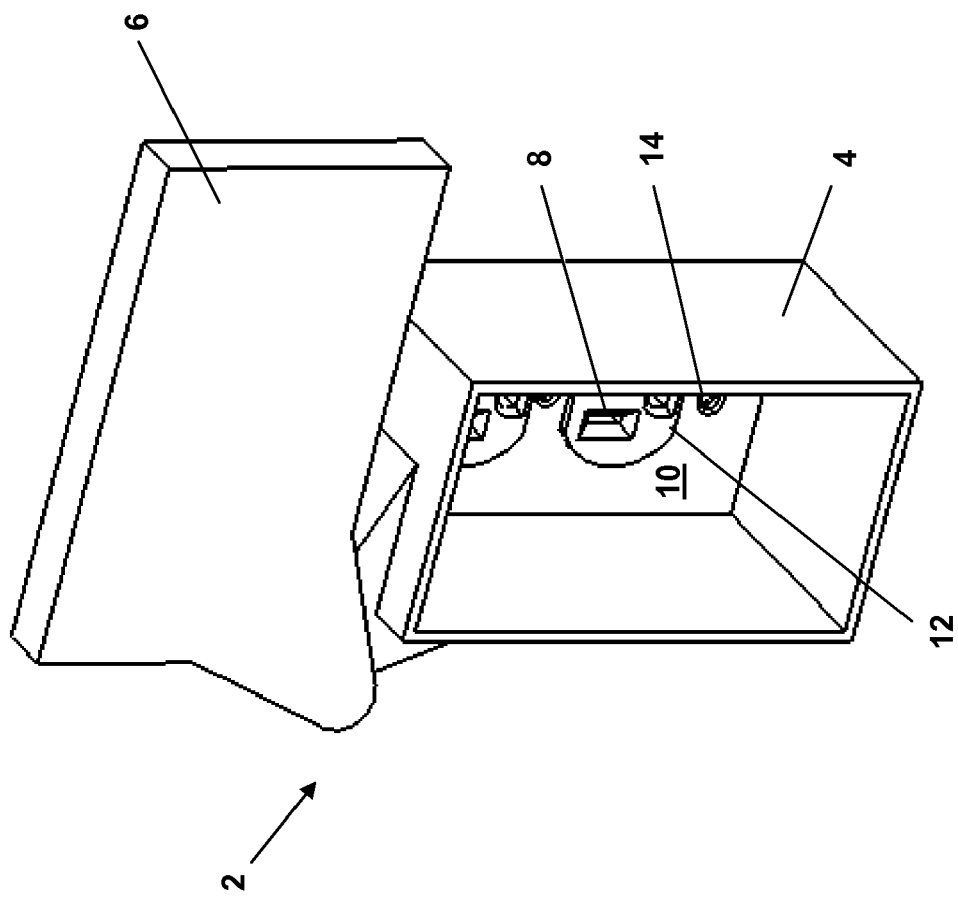
FIG. 3 is a front perspective view of the electrical device cover of FIG. 1 in an open position, exposing the electrical device aperture of the base unit.

Referring to FIG. 3, an implementation of an electrical device cover 2 is illustrated with the lid 6 rotated away from the base unit 4. The face of the electrical device 8 can be seen within the base unit 4, as well as the face 10 of the base unit 4 itself. The face of the electrical device 8 may extend through an electrical device aperture 12 configured to accommodate the electrical device 8 in the face 10 of the base unit 4. The base unit 4 may also include removable tabs that allow the electrical device aperture 12 to be converted to accommodate a second electrical device type. In addition, the base unit 4 may include an adapter plate that may allow the electrical device aperture 12 to be converted to accommodate a second electrical device type. In particular implementations of an electrical device cover 2, the adapter plate may also include a removable tab to allow the electrical device aperture 12 to be converted to accommodate a second electrical device type. Relevant teachings regarding removable tabs and adapter plates may be found in U.S. Pat. No. 6,960,721 to Shotey et al. entitled "Convertible Electrical Device Cover Having Removable Tabs With Offset Grooves," the disclosure of which is hereby incorporated herein by reference.

Figure 4:
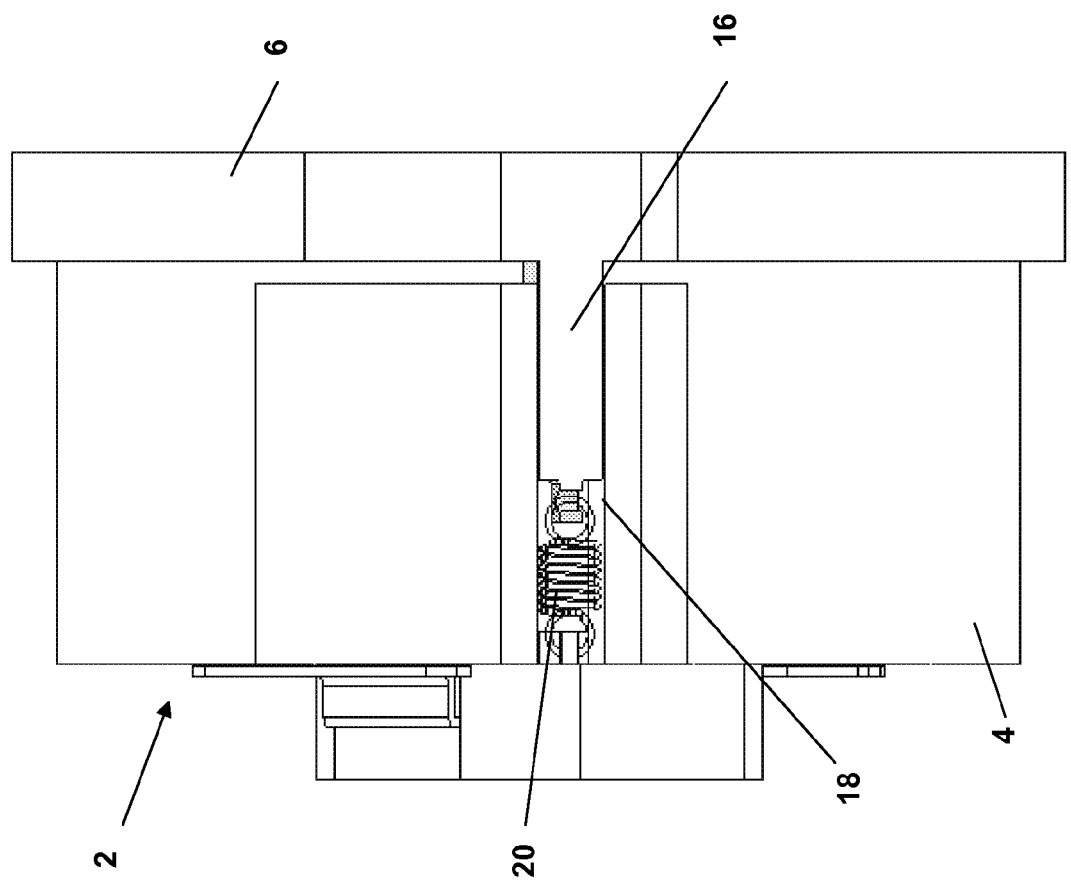
FIG. 4 is a cross sectional view of the electrical device cover of FIG. 1 taken along sectional line A.

Referring to FIG. 4, a cross section view of the area along the sectional line A shown in FIG. 1 is illustrated. This cross section is taken across the point at which the lid 6 and base unit 4 are coupled. In the particular implementation of an electrical device cover 2 illustrated, the lid 6 may include a pin 16 inserted into a pin opening 18 of the base unit 4. The pin 16 may be coupled to the base unit 4 through a spring 20, which may provide a bias force that serves to slidably retract the lid 6 over the base unit 4. The pin 16 may also be sized to allow the lid 6 to slidably move away from the base unit 4 under the influence of an external force. While the particular pin 16 illustrated in FIG. 4 consists of a single prong, in other particular implementations, the pin 16 may include two or more prongs.

Figure 5:
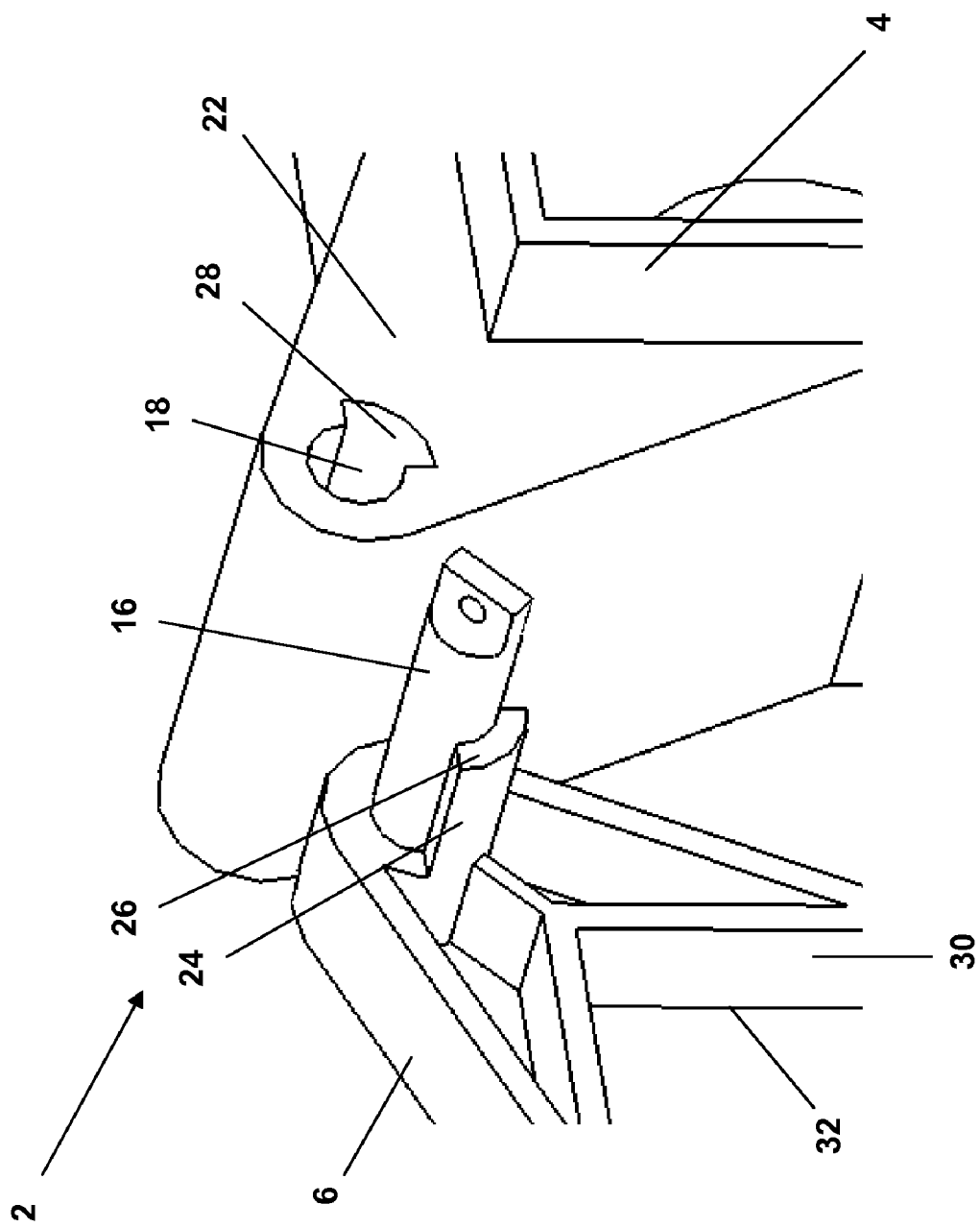
FIG. 5 is a detail view of a particular implementation of an electrical device cover with the pin of the lid removed from the pin opening of the base unit and shown adjacent to the base unit.

FIG. 5 illustrates a detail view of a particular implementation of an electrical device cover 2 with the pin 16 of the lid 6 removed from the pin opening 18 in the base unit 4. As illustrated, the pin opening 18 may include a pin support 22 that extends from the base unit 4. In particular implementations, the pin opening 18 may be located on a side, a corner, or within the base unit 4. In the implementation illustrated in FIG. 5, the pin 16 may include a key 24 with a key face 26. The key 24 may be sized to fit into a keyway notch 28 in the pin opening 18. The height of the key face 26 along the pin 16 may be such that the lid 6 is permitted to rotate freely in a plane substantially parallel to the base unit 4 until the key 24 engages with the keyway notch 28. When the key 24 engages with the key way notch 28, the pin 16 may move slidably into the pin opening 18 under the influence of the bias from the spring inside the pin opening 18. In particular implementations of the pin opening 18 and key face 26, one or both of an edge of the pin opening 18 extending to the keyway notch 28 and the surface of the key face 26 may be sloped so that the key face 26 has a tendency to slide along the edge of the keyway notch 28 as the lid 6 rotates toward a closed position over the base unit 4. In implementations where a spring is used, such as the spring 20 shown in FIG. 4, the tension of the spring and the angle of the opening of the keyway notch 28 and/or key face 26 (complimentary angles if both are angled), may serve to bias the lid to its closed position. Even where angle(s) is/are used, the lid 6 is still considered to rotate in a plane substantially parallel to the base.

The key face 26 may allow particular implementations of an electrical device cover 2 to be weatherproofed through a flange 30 that extends along at least a portion of the perimeter 32 of the lid 6. The key face 26 may also allow the lid 6 to be extended away from the base unit 4 a sufficient distance to allow lid to rotate in a plane substantially parallel to the base unit 4 without encountering interference from the flange 30. In other particular implementations of a lid 6, no flange 30 may be present and no key face 26 may be utilized. Also, implementations of a lid 6 may be coupled at any location and to any piece forming the base unit 4.

Use.

Figure 6C:
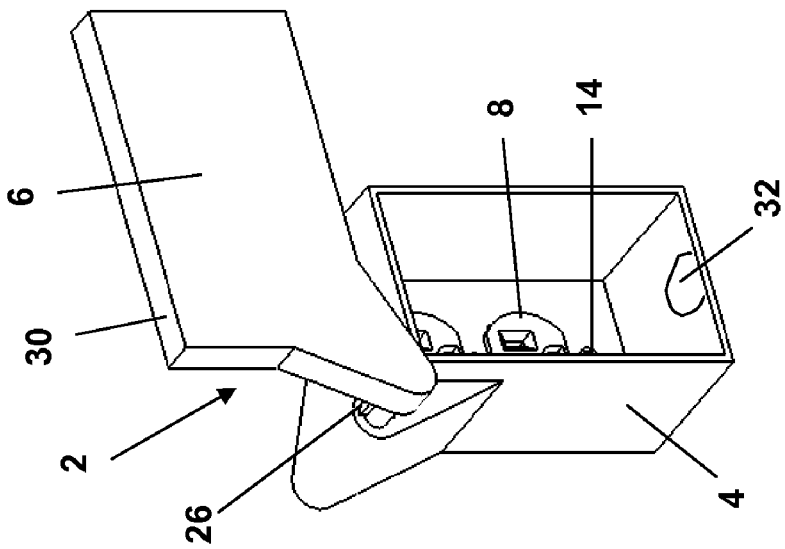
FIG. 6C is a front perspective view of the cover of FIG. 6A in an open position.
Figure 6B:
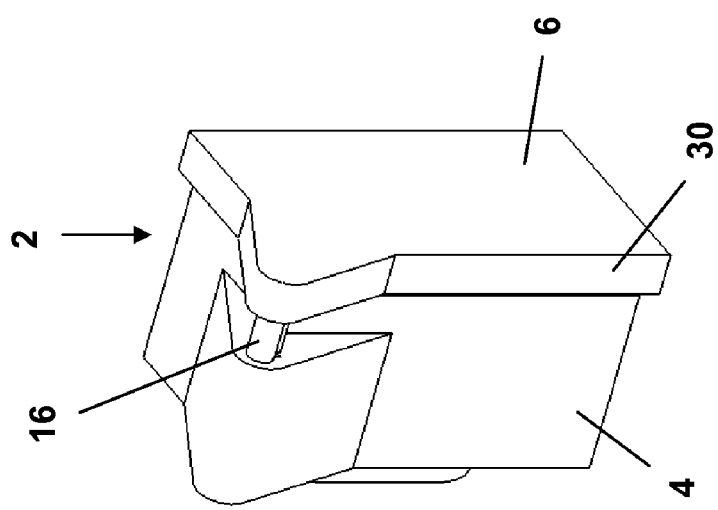
FIG. 6B is a front perspective view of the cover of FIG. 6A in an extended position.
Figure 6A:
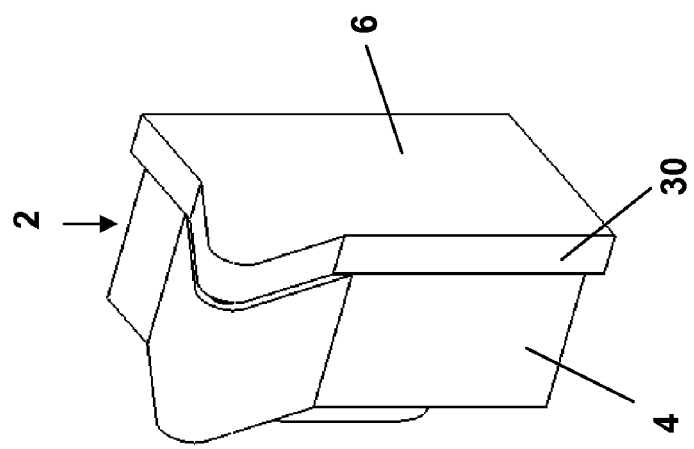
FIG. 6A is a front perspective view of a particular implementation of an electrical device cover in a closed position.

Referring to FIG. 6A, a particular implementation of an electrical device cover 2 is illustrated in a closed position, where the lid 6 is closed over the base 4 and the flange 30 of the lid 6 is slidably coupled over the base unit 4. Referring to FIG. 6B, the electrical device cover 2 may be opened by extending the lid 6 away from the base unit 4 through an external force against the bias of a spring (if used) coupled to the pin 16. FIG. 6B, therefore, illustrates a particular implementation of an electrical device cover 2 in an extended position. In the extended position, the flange 30 of the lid 6 is raised above the base unit 4 sufficiently to permit the flange 30 to clear the base unit 4 and allow the lid 6 to rotate freely.

FIG. 6C illustrates the electrical device cover 2 in an open position, where the lid 6 has been rotated in a plane substantially parallel with the base unit 4 until the interior of the base unit 4 has been exposed. The rotation of the lid 6 may be enabled by the key face 26, angled or flat, which may be used to hold the lid 6 away from the base unit 4 at a sufficient distance to allow the flange 30 to clear the base unit 4. In the open position, the electrical device 8 may be exposed. Because the lid 6 can be rotated in a plane substantially parallel with the base unit 4 to expose the electrical device 8 inside the electrical device cover 2, the ease of installation of an electrical device cover 2 may be improved as an installer can now more easily see inside the electrical device cover 2 to tighten the box mounting screws inserted into the box mounting screw apertures 14 to secure the electrical device cover 2 to a wall or other surface.

As illustrated in FIG. 6C, particular implementations of an electrical device cover 2 may include a cord port 32 in a surface of the lid, the base, or in both the lid and the base. The cord port 32 may be open, closed, or partially closed by a barrier that serves to block entry of water and other contaminants. The cord port 32 may also include a removable tab. A plurality of cord ports 32, in one or more sides of the base unit or cover, may also be included in particular implementations of an electrical device cover 2.

Implementations of an electrical device cover 2 and implementing components (lids 6, base units 4, etc.) may be constructed of a wide variety of materials. For example, the components may be formed of: rubbers (synthetic and/or natural) and/or other like materials; glasses (such as fiberglass), carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof. For the exemplary purposes of this disclosure, the lid and base unit may be formed of a plastic material like a polyvinyl chloride (PVC).

Some components defining any electrical box implementation may be manufactured simultaneously and integrally joined with one another, while other components may be purchased pre-manufactured or manufactured separately and then assembled with the integral components. The various implementations may be manufactured using conventional procedures as added to and improved upon through the procedures described here.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener (e.g. a bolt and a nut, a screw, a rivet, a pin, and/or the like), washers, retainers, wrapping, wiring, any combination thereof, and/or the like for example, depending on, among other considerations, the particular material forming the components. For the exemplary purposes of this disclosure, the lid and base may be formed separately by an injection molding process, then coupled together by a separate assembly step.

It will be understood that implementations are not limited to the specific components disclosed herein, as virtually any components consistent with the intended operation of a method and/or system implementation for an electrical device cover may be utilized. Accordingly, for example, although particular lids, base units, pins, and springs may be disclosed, such components may comprise any shape, size, style, type, model, version, class, grade, measurement, concentration, material, weight, quantity, and/or the like consistent with the intended operation of a method and/or system implementation for a electrical device cover may be used.

In places where the description above refers to particular implementations of an electrical device cover, it should be readily apparent that a number of modifications may be made without departing from the spirit thereof and that these implementations may be applied to other electrical device covers. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A weatherproof electrical device cover comprising:
   a base unit comprising a face, an electrical device aperture, and a box mounting screw aperture therethrough;
   a lid rotatably coupled to the base unit; and
   a cord port comprised in at least one of a surface of the lid and the base unit;
   wherein the lid rotates over the base unit in a plane substantially parallel with the base unit;
   wherein the lid covers the electrical device aperture of the base unit when the lid is closed over the base unit;
   wherein the lid further comprises a pin and the lid is coupled to the base unit at a pin opening in the base unit; and
   wherein the pin is coupled within the pin opening to the base unit through a spring.

2. The weatherproof electrical device cover of claim 1, wherein the base unit and the lid are rotatably coupled at least one of a side of the base unit and a corner of the base unit.

3. The weatherproof electrical device cover of claim 1, wherein the lid of the base unit is configured to close over the base unit under gravity force when the cover is mounted to a wall in either a vertical or a horizontal orientation.

4. The weatherproof electrical device cover of claim 1, wherein the base unit is configured to accommodate a first electrical device type and the base unit further comprises at least one removable tab, wherein removal of the at least one removable tab converts the electrical device aperture in the base unit to accommodate at least a second electrical device type different from the first electrical device type.

5. The weatherproof electrical device cover of claim 1, wherein the base unit is configured to accommodate a first electrical device type and the base unit further comprises at least one adapter plate, wherein the adapter plate converts the electrical device aperture in the base unit to accommodate at least a second electrical device type different from the first electrical device type.

6. The weatherproof electrical device cover of claim 5, wherein the adapter plate further comprises at least one removable tab, wherein removal of the at least one removable tab converts the electrical device aperture in the base unit configured to accommodate a first electrical device type to accommodate at least a second electrical device type different from the first electrical device type.

7. A weatherproof electrical device cover comprising:
   a base unit comprising a face, an electrical device aperture, and a box mounting screw aperture therethrough;
   a lid rotatably coupled to the base unit; and
   a cord port comprised in at least one of a surface of the lid and the base unit;

wherein the lid rotates over the base unit in a plane substantially parallel with the base unit;

wherein the lid covers the electrical device aperture of the base unit when the lid is closed over the base unit;

wherein the lid further comprises a pin and the lid is coupled to the base unit at a pin opening in the base unit; and wherein the pin further comprises a key and the pin opening further comprises a keyway notch, wherein the lid rotatably closes over the base unit when the key is aligned with the keyway notch.

8. A weatherproof electrical device cover comprising:

a base unit comprising a face, an electrical device aperture and a box mounting screw aperture therethrough;

a lid rotatable coupled to the base unit; and a cord port comprised in at least one of a surface of the lid and the base unit;

wherein the lid rotates over the base unit in a plane substantially parallel with the base unit;

wherein the lid covers the electrical device aperture of the base unit when the lid is closed over the base unit; and wherein the lid further comprises a perimeter and a flange extending outwardly along at least a portion of the perimeter, wherein the flange is configured to slidably couple over the base unit when the lid is closed over the base unit.

9. An electrical device cover comprising:

a base unit comprising an electrical device aperture, a box mounting screw aperture therethrough, and a pin opening;

a lid comprising a pin;

a cord port comprised in at least one of a surface of the lid and the base unit;

wherein the base unit and lid are coupled through the pin at the pin opening;

wherein the lid rotates over the base unit in a plane substantially parallel with the base unit; and wherein the pin is coupled within the pin opening to the base unit through a spring.

10. The electrical device cover of claim 9, wherein the base unit and the lid are rotatably coupled at least one of a side of the base unit and a corner of the base unit.

11. The electrical device cover of claim 9, wherein the lid of the base unit is configured to close over the base unit under gravity force when the cover is mounted to a wall in either a vertical or a horizontal orientation.

12. The electrical device cover of claim 9, wherein the base unit is configured to accommodate a first electrical device type and the base unit further comprises at least one removable tab, wherein removal of the at least one removable tab converts the electrical device aperture in the base unit to accommodate at least a second electrical device type different from the first electrical device type.

13. The electrical device cover of claim 9, wherein the base unit is configured to accommodate a first electrical device type and the base unit further comprises at least one adapter plate, wherein the adapter plate converts the electrical device aperture in the base unit to accommodate at least a second electrical device type different from the first electrical device type.

14. The electrical device cover of claim 13, wherein the adapter plate further comprises at least one removable tab, wherein removal of the at least one removable tab converts the electrical device aperture in the base unit configured to accommodate a first electrical device type to accommodate at least a second electrical device type different from the first electrical device type.

15. An electrical device cover comprising:

a base unit comprising an electrical device aperture a box mounting screw aperture therethrough, and a pin opening;

a lid comprising a pin;

a cord port comprised in at least one of a surface of the lid and the base unit;

wherein the base unit and lid are coupled through the pin at the pin opening;

wherein the lid rotates over the base unit in a plane substantially parallel with the base unit; and wherein the lid further comprises a perimeter and a flange extending outwardly along at least a portion of the perimeter, wherein the flange is configured to slidably couple over the base unit when the lid is closed over the base unit.

16. An electrical device cover comprising:

a base unit comprising an electrical device aperture a box mounting screw aperture therethrough, and a pin opening;

a lid comprising a pin;

a cord port comprised in at least one of a surface of the lid and the base unit;

wherein the base unit and lid are coupled through the pin at the pin opening;

wherein the lid rotates over the base unit in a plane substantially parallel with the base unit; and wherein the pin further comprises a key and the pin opening further comprises a keyway notch, wherein the lid rotatably closes over the base unit when the key is aligned with the keyway notch.

* * * * *